(12) United States Patent
Thumm

(10) Patent No.: US 11,167,820 B2
(45) Date of Patent: Nov. 9, 2021

(54) GUIDE ELEMENT FOR BICYCLE DRIVE MEANS

(71) Applicant: Canyon Bicycles GmbH, Koblenz (DE)

(72) Inventor: Johannes Thumm, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 363 days.

(21) Appl. No.: 16/351,872

(22) Filed: Mar. 13, 2019

(65) Prior Publication Data

US 2019/0283838 A1 Sep. 19, 2019

(30) Foreign Application Priority Data

Mar. 15, 2018 (DE) ...................... 20 2018 001 375.7

(51) Int. Cl.
| | |
|---|---|
| *B62M 9/126* | (2010.01) |
| *B62M 9/125* | (2010.01) |
| *B62M 9/136* | (2010.01) |
| *B62K 25/28* | (2006.01) |
| *B62M 9/00* | (2006.01) |

(52) U.S. Cl.
CPC ............. *B62M 9/126* (2013.01); *B62K 25/28* (2013.01); *B62M 9/125* (2013.01); *B62M 9/136* (2013.01); *B62M 2009/007* (2013.01)

(58) Field of Classification Search
CPC ...... B62M 9/126; B62M 9/136; B62M 9/125; B62M 2009/007; B62K 25/28
USPC .................................................. 474/140, 144
See application file for complete search history.

(56) References Cited

U.S. PATENT DOCUMENTS

2017/0274962 A1 9/2017 Emura et al.

FOREIGN PATENT DOCUMENTS

| | | |
|---|---|---|
| CH | 222941 A | 8/1942 |
| DE | 2041296 | 4/1971 |
| DE | 29904311 U1 | 8/1999 |

*Primary Examiner* — Henry Y Liu
(74) *Attorney, Agent, or Firm* — The Webb Law Firm

(57) ABSTRACT

A guide element for bicycle drive means includes a main bearing pin for fixing a swing arm bearing. Further, a spacer sleeve is provided which is arranged on the main bearing pin for reducing a distance between a drive ring and a bicycle frame element.

13 Claims, 1 Drawing Sheet

GUIDE ELEMENT FOR BICYCLE DRIVE MEANS

CROSS-REFERENCE TO RELATED APPLICATION

This application claims priority to German Utility Model Application No. 20 2018 001 375.7 filed Mar. 15, 2018, the disclosure of which is hereby incorporated by reference in its entirety.

BACKGROUND OF THE INVENTION

Field of the Invention

The invention relates to a guide element for bicycle drive means.

Description of Related Art

Bicycle drive means are usually realized in the form of chains or belts. In cases where drive means are realized as chains, it is known to provide a chain guide in the region of a drive ring or chain ring. The chain guide serves to prevent a detachment of the chain in the region of the chain ring or to reduce the risk of detachment. Particularly, by use of a corresponding chain guide, it is intended to prevent detachment of the chain toward the inside, thus avoiding a jamming of the chain between a chain ring and a frame element such as e.g. the bottom bracket housing. In case of a single drives, i.e. drives which in the region of the bottom bracket comprise only one drive or chain ring, it is known to fix a corresponding chain guide via clamps on the bicycle frame, particularly on the saddle tube of the bicycle frame. Further, there are known chain guides which are fixed on the bottom bracket housing. These are relatively complex additional component parts provided with fastening elements. Such a design inherently causes increased costs, additional weight and additional mounting work.

SUMMARY OF THE INVENTION

It is an object of the invention to provide a guide element for a bicycle drive means which can be arranged, particularly fastened, on the bicycle in a simple manner.

According to the invention, the above object is achieved by a guide element for a bicycle drive means.

The guide element according to the invention, provided for a bicycle drive means such as e.g. bicycle chains and bicycle belts, comprises a main bearing pin and a spacer sleeve. The main bearing pin serves for fixation of a swing arm bearing of a bicycle rear wheel swing structure. Bicycles with rear wheel swing structures, i.e. with a spring-loaded rear stay, comprise a main bearing. Via the main bearing, the rear wheel swing structure and respectively the spring-loaded rear stay is pivotally connected to the bicycle frame. A further connection of the rear stay is usually realized by a compensator which is connected to the bicycle frame on the one hand and to a damper element on the other hand.

According to the invention, the spacer sleeve is arranged on the main bearing pin. Herein, the spacer sleeve is arranged on the main bearing pin in such a manner that there is realized a decrease of the distance between the drive ring and a bicycle frame element such as e.g. a frame tube, a bottom bracket or the like. With such a reduction of this distance, the drive means is prevented from sliding off or becoming detached toward the inside since, by the spacer sleeve of the invention, the distance between the drive ring and a bicycle frame element is reduced to such an extent that the remaining distance is smaller than the dimensions of the drive means.

Such an arrangement of the spacer sleeve on the main bearing element is advantageous particularly in embodiments of a bicycle in which the main bearing of the rear wheel swing structure is arranged in the region of the drive ring. If the main bearing is arranged at a distance from the drive ring, it can be provided, according to a preferred embodiment of the invention, that the spacer sleeve comprises a projection which in the mounted condition extends into the region between the drive ring and the bicycle frame.

According to a first preferred embodiment of the invention, the spacer sleeve comprises a collar. The collar engages behind and respectively around a head of the main bearing pin. Herein, the spacer sleeve is configured in such a manner that the main bearing pin is inserted through an opening of the spacer sleeve until an underside of the head of the main bearing pin is in abutment on the collar. Such an embodiment has the advantage that conventional main bearing bolts can be used. As a result, also this embodiment allows for retrofitting in a simple manner. In certain cases, the shape of the main bearing pin, particularly of the head of the main bearing pin, has to be adapted to a slight extent. In such a case, also the main bearing pin would have to be exchanged during the retrofitting. Preferably, the collar is configured to engage behind the head of the main bearing element. The collar can be configured in such a manner that, in the mounted state, it takes over the function of the head of the main bearing pin. Particularly, by means of the collar, a bearing inner ring of the main bearing is fixed.

According to a preferred embodiment of the invention, the spacer sleeve is configured to be rotatable and respectively variable in position relative to the main bearing pin. This has the advantage that the position of the spacer sleeve can be set independently from the position of the main bearing pin. The position of the main bearing pin can normally not be changed for defining the position of the spacer sleeve because, by the main bearing pin, there must always be exerted a sufficient force on the inner ring of the bearing for fixation thereof. A twisting or a changing of the position of the spacer sleeve relative to the main bearing pin is of advantage particularly if the main bearing is not provided in the corresponding position relative to the drive ring but at a distance therefrom. In embodiments wherein the position of the main bearing exactly fits the position of the drive ring, it is also possible to design the spacer sleeve in one piece with the main bearing pin.

According to a further preferred embodiment, the spacer sleeve is fastened to the main bearing pin via a fastening means such as e.g. a screw, a locking connection or the like. Particularly, this makes it possible to mount the main bearing pin independently from the provision of the spacer sleeve. According to a preferred embodiment, it is possible, particularly, to first mount the main bearing pin and to fix the bearing by use of the correspondingly provided moment of rotation. In a next step, the spacer sleeve can then be connected to the main bearing pin via said fastening means.

It is particularly preferred that the main bearing pin comprises a central bore or opening which particularly can be provided with a thread. In this central bore, the fastening means can then be arranged, particularly by threaded engagement. In this respect, it is preferred that the central bore is arranged within an internal hexagon of the main bearing pin. Usual main bearing pins comprise an internal hexagon so that the main bearing pin can be screwed into the frame for fixing the inner ring of the bearing. In so far, it is preferred according to the invention that the central bore for receiving the fastening means for the spacer sleeve is arranged within this internal hexagon, i.e. in the interior of a pin shaft of the main bearing pin. Thus, the fastening means such as e.g. the screw would be inserted and respectively screwed into the central bore through the hexagon. Thereby, a very reliable fixation of the spacer sleeve is rendered possible in a very simple manner. Further, it is again possible to change the position of the spacer sleeve for setting a correspondingly required positional arrangement of the spacer sleeve which optionally comprises a projection.

Preferably, the spacer sleeve comprises a contact surface which is in abutment on the head of the main bearing pin on a corresponding support surface. The contact surface serves particularly for centering the spacer sleeve with respect to a central and respectively longitudinal axis of the main bearing pin. For this purpose, it is preferred that the contact surface has a conical shape. The support surface has a complementary shape in correspondence thereto. By the conical shape, there is, on the one hand, realized a centering effect while, on the other hand, it is rendered possible in a simple manner to rotate the spacer sleeve for positional definition.

According to a particularly preferred embodiment of the guide element, the spacer sleeve comprises an extension. The extension is designed in such a manner that, in the mounted state, it is arranged radially relative to the drive ring, particularly above the drive ring, so that, in the mounted state, the drive means is arranged between the drive ring and the extension. Thereby, it is avoided that the drive means might be lifted off the drive ring in upward direction. Especially in a spacer sleeve comprising such an extension, it is particularly preferred that the spacer sleeve is rotatable. By rotating the spacer sleeve, the position of the extension can be defined. This particularly allows for an adaptation to various sizes of the drive rings.

Said extension is preferably oriented in the longitudinal direction of the main bearing pin. Then, the extension runs substantially axially to the spacer sleeve and the main bearing pin. However, the extension preferably has a distance to the central axis of the spacer sleeve so that, by rotating the spacer sleeve, a change of position and an adjustment are rendered possible. As viewed in the circumferential direction of the spacer sleeve, the extension comprises an angle of less than 90°, particularly less than 45°. The width of the extension in the circumferential direction of the spacer sleeve is preferably 5 to 15 mm.

Particularly, the extension is arranged on a side facing away from the main bearing pin. In case of a spacer sleeve with contact surface, the extension is particularly arranged opposite to the contact surface.

The guide element for bicycle drive means as provided by the invention particularly has the advantage that it can be mounted in a simple manner. Depending on the respective embodiment, also retrofitting is possible in a simple manner. The guide element of the invention makes it possible to reduce the costs and the weight because it obviates the need for complex additional fastening elements for fastening a chain guide on the frame. Further, the guide element of the invention is very well integrated into the external appearance of the bicycle.

The invention will be explained in greater detail hereunder by way of preferred embodiments with reference to the accompanying drawings.

BRIEF DESCRIPTION OF THE DRAWINGS

The following is shown.

DESCRIPTION OF THE INVENTION

Figure 1:
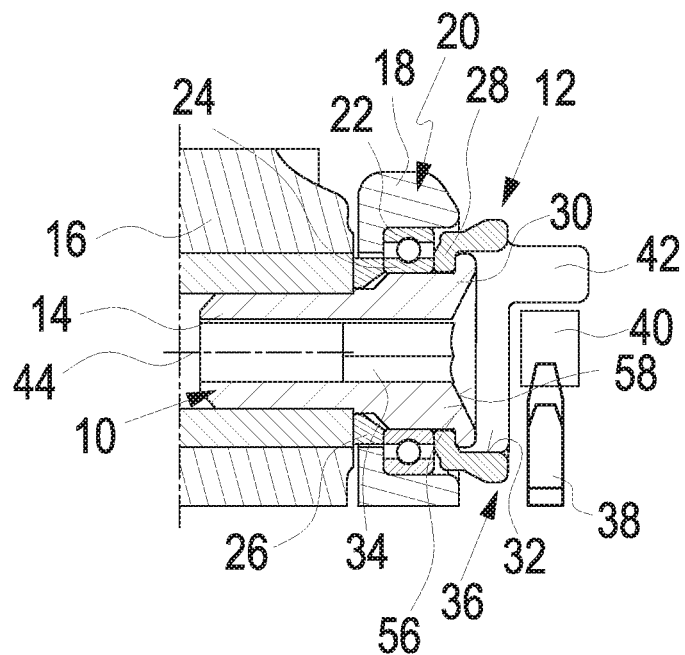
FIG. 1 is a schematic sectional view of a first preferred embodiment.

In the first preferred embodiment of the guide element according to the invention as illustrated in FIG. 1, the guide element comprises a main bearing pin 10 and a spacer sleeve 12. The main bearing pin 10, designed as a separate component part, comprises a shaft 14 formed with a thread. The shaft 14 is adapted to be screwed into a bore, provided with an inner thread, of a bicycle frame element 16. A component part of a rear wheel swing structure such as e.g. a chain stay 18 is pivotally connected to the frame element 16 via a bearing 20. In this arrangement, an outer ring 22 of bearing 20 is fixed in the chain stay, and an inner ring 24 of bearing 20 is fixed via the main bearing pin 10. The fixing of the inner ring 24 to the bicycle frame element 16 is realized by providing a ring 26 between the bicycle frame element 16 and the inner ring 24 of bearing 20. On the outer side, the fixing is performed via the guide element of the invention.

For this purpose, the spacer sleeve 12 comprises a collar 28. The collar 28 engages behind a head 30 of main bearing pin 10. For this purpose, the spacer sleeve 12 comprises an opening 32 through which the main bearing pin 10 can be inserted from the right-hand side in FIG. 1 until the head 30 is in abutment on the collar 38. In the mounted state, the collar 28 is arranged between the head 30 and the inner ring 24 of bearing 20.

For fixing the main bearing pin 10, the latter comprises an internal hexagon 34. By screwing the main bearing pin 10 into the bicycle frame element 16, the inner ring 24 of bearing 20 will be fixed.

The spacer sleeve 12, when in its mounted state (FIG. 1), is arranged in a recess 36 between a drive ring 38 and a bicycle frame element, wherein, in the illustrated exemplary embodiment, the bicycle frame element is the chain stay 18. Since the spacer sleeve 12 extends into this intermediate space 36, it is avoided that a drive means 40 such as e.g. a chain or a belt might happen to enter this intermediate space. Thereby, jamming of the drive means 40 between the drive ring 38 and a bicycle frame element such as e.g. a bottom bracket, is avoided.

Further, the spacer sleeve 12 comprises an extension 42. The latter extends in axial direction, i.e. parallel to a longitudinal axis 44 of main bearing pin 10. In the mounted state (FIG. 1), the extension 42 is arranged radially to the drive ring 38 so that the drive means 40 is located between the drive ring 38 and the extension 42.

Depending on the position of the main bearing pin 10 in accordance with the design of the bicycle frame and depending on the size of the drive ring, an adjustment of the extension 42 is possible by rotating the spacer sleeve 12. For rotating the spacer sleeve 12, the main bearing pin 10 has to be slightly loosened. After adjustment, the main bearing pin has to be tightened again, particularly with the provided moment of rotation, so that a safe fixation of the bearing 20 is ensured.

The spacer sleeve 12, except for the extension 42, is arranged in rotational symmetry with the axis 44.

Figure 2:
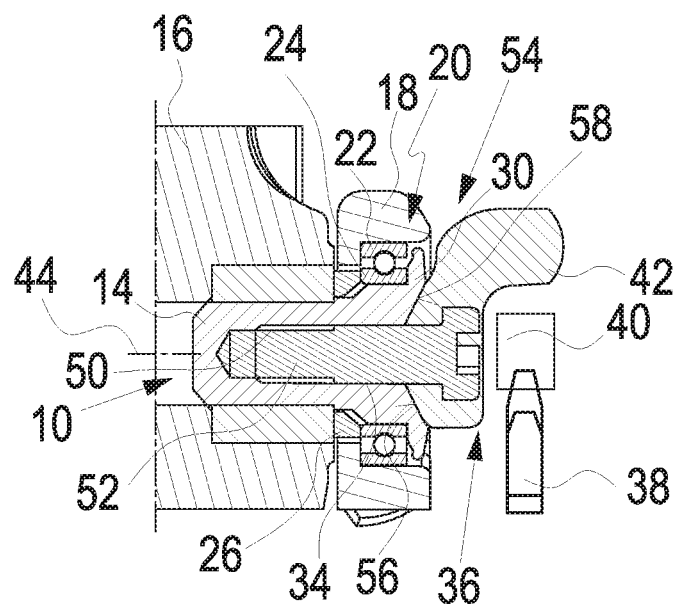
FIG. 2 is a schematic sectional view of a second preferred embodiment.

In regard to the alternative embodiment of the invention shown in FIG. 2, similar or identical components are marked by the same reference numerals.

In the exemplary embodiment shown in FIG. 2, the main bearing pin 10 is of a slightly different design. The head 30 of main bearing pin 10 is not engaged by a collar around it but, as usually the case in conventional main bearing pins, presses onto the inner ring 24 of bearing 20. The main bearing pin 10 comprises, in addition to the internal hexagon 34, an inner thread 50 within the shaft 14. The inner thread 50 serves for receiving a fastening means designed as a screw 52, which will be inserted through the opening—comprising the internal hexagon 34—of main bearing pin 10.

The fastening means 52 serves for fastening a spacer sleeve 54. In the exemplary embodiment shown in FIG. 2, the spacer sleeve 54 is arranged substantially on the outer side of the head 30 of main bearing pin 10. To begin with, the spacer sleeve 54, in a way corresponding to the spacer sleeve 12 shown in FIG. 1, is arranged in such a manner in an intermediate space 36 that the drive means 40 is prevented from sliding off toward the inside. Further, the spacer sleeve 54 again comprises an extension 42 which is designed and arranged corresponding to said extension 42.

For fixation of the spacer sleeve 54, this sleeve comprises a conical contact surface 56 arranged in abutment on a complementary receiving surface 58 of the head 30 of the main bearing pin.

In the mounting process of the embodiment shown in FIG. 2, it is possible to first mount the main bearing pin 10 and fix the bearing 20. The mounting of the spacer sleeve 54 is performed independently from the mounting of the main bearing pin by means of the screw 52. The spacer sleeve 54 can be rotated around the axis 44 so that, again, an adjustment and respectively a positional definition of the extension 42 is possible in a simple manner. The extension can at all times be readjusted in a simple way because, in order to do so, only the screw 52 has to be loosened. A loosening of the main bearing pin 10 and a subsequent renewed fixing of the main bearing pin 10 with required moment of rotation will not be required.

The invention claimed is:

1. A guide element for a bicycle drive, comprising
   a main bearing pin for fixing a swing arm bearing of a rear wheel swing structure, and
   a spacer sleeve arranged on the main bearing pin for reducing the distance between a drive ring and a bicycle frame element.

2. The guide element according to claim 1, wherein the spacer sleeve comprises a collar engaging behind and around a head of the main bearing pin.

3. The guide element according to claim 1, wherein the spacer sleeve is fastened to the main bearing pin via a fastening element.

4. The guide element according to claim 3, wherein the fastening element is connected to the main bearing pin via a central bore.

5. The guide element according to claim 4, wherein the central bore is connected to the main bearing pin within the main bearing pin.

6. The guide element according to claim 5, wherein the central bore is arranged in the main bearing pin on an inner side of an internal hexagon.

7. The guide element according to claim 1, wherein the spacer sleeve comprises a contact surface for centering, said contact surface in a mounted state abutting on the main bearing pin.

8. The guide element according to claim 7, wherein the contact surface is conical.

9. The guide element according to claim 1, wherein the spacer sleeve is connected to an extension.

10. The guide element according to claim 9, wherein the extension is arranged on a side which in a mounted state faces away from the main bearing pin.

11. The guide element according to claim 9, wherein the extension is arranged on a side of the spacer sleeve facing away from the contact surface.

12. The guide element according to claim 4, wherein the central bore comprises a thread, of the main bearing pin.

13. The guide element according to claim 7, wherein in the mounted state, the contact surface of the spacer sleeve abuts a contact surface provided on the head of the main bearing pin.

* * * * *